(12) United States Patent
Nenner et al.

(10) Patent No.: US 10,887,821 B2
(45) Date of Patent: Jan. 5, 2021

(54) TRANSMITTING SMALL AND INFREQUENT COMMUNICATION DATA BETWEEN, ON THE ONE HAND, A PLURALITY OF INTERNET-OF-THINGS COMMUNICATION DEVICES, AND, ON THE OTHER HAND, A MOBILE COMMUNICATION NETWORK

(71) Applicant: Deutsche Telekom AG, Bonn (DE)

(72) Inventors: Karl-Heinz Nenner, Bornheim (DE); Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/578,717

(22) PCT Filed: Jun. 3, 2016

(86) PCT No.: PCT/EP2016/062625
§ 371 (c)(1),
(2) Date: Dec. 1, 2017

(87) PCT Pub. No.: WO2016/193415
PCT Pub. Date: Dec. 8, 2016

(65) Prior Publication Data
US 2018/0160358 A1 Jun. 7, 2018

(30) Foreign Application Priority Data
Jun. 5, 2015 (EP) ..................................... 15170923

(51) Int. Cl.
*H04W 72/04* (2009.01)
*H04W 40/24* (2009.01)
(Continued)

(52) U.S. Cl.
CPC ............. *H04W 40/24* (2013.01); *H04L 29/08* (2013.01); *H04L 67/04* (2013.01); *H04L 67/12* (2013.01);
(Continued)

(58) Field of Classification Search
CPC ..... H04W 40/24; H04W 4/70; H04W 88/182; H04L 29/08; H04L 67/28; H04L 67/2842; H04L 67/12; H04L 67/04
See application file for complete search history.

(56) References Cited

U.S. PATENT DOCUMENTS 9,973,877 B2 5/2018 Liao
2002/0058480 A1* 5/2002 Ikeda ....................... H04L 29/06
455/67.11

(Continued)

FOREIGN PATENT DOCUMENTS

CN 104185138 A 12/2014
EP 2737735 6/2014
(Continued)

OTHER PUBLICATIONS

Chandra S. Bontu et al. "Wireless Wide-Area Networks for Internet of Things: An Air Interface Protocol for IoT and a Simultaneous Access Channel for Uplink IoT Communication" IEEE Vehicular Technology Magazine, IEEE, US, vol. 9, No. 1, Mar. 2014 (Mar. 1, 2014), pp. 54-63 (Year: 2014).*
(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

A method for transmitting small and infrequent communication data between, on the one hand, a plurality of internet-of-things communication devices, and, on the other hand, a
(Continued)

mobile communication network includes: transmitting, by a base station entity, the small and infrequent communication data, at least partly, as part of a payload portion of an IP packet towards a network node of a core network.

17 Claims, 1 Drawing Sheet

(51) Int. Cl.
    *H04W 4/70* (2018.01)
    *H04L 29/08* (2006.01)
    *H04W 88/16* (2009.01)
    *H04W 74/02* (2009.01)
    *H04L 12/725* (2013.01)
    *H04W 40/04* (2009.01)
    *H04W 88/18* (2009.01)

(52) U.S. Cl.
    CPC ............ *H04L 67/125* (2013.01); *H04L 67/28* (2013.01); *H04L 67/2842* (2013.01); *H04W 4/70* (2018.02); *H04W 88/16* (2013.01); *H04L 45/30* (2013.01); *H04W 40/04* (2013.01); *H04W 74/02* (2013.01); *H04W 88/182* (2013.01)

(56) References Cited

U.S. PATENT DOCUMENTS

| | | | | |
|---|---|---|---|---|
| 2010/0057485 | A1* | 3/2010 | Luft | H04W 12/12 455/411 |
| 2012/0134346 | A1* | 5/2012 | Bosch | H04W 8/085 370/338 |
| 2012/0302229 | A1* | 11/2012 | Ronneke | H04L 29/12754 455/422.1 |
| 2012/0309419 | A1* | 12/2012 | Lee | H04W 74/008 455/456.1 |
| 2013/0080597 | A1 | 3/2013 | Liao | |
| 2013/0115993 | A1* | 5/2013 | Jain | H04W 76/02 455/517 |
| 2014/0047322 | A1 | 2/2014 | Kim et al. | |
| 2014/0122878 | A1* | 5/2014 | Cho | H04L 67/02 713/168 |
| 2015/0029918 | A1* | 1/2015 | Bangolae | H04W 4/70 370/311 |
| 2015/0282145 | A1* | 10/2015 | Kim | H04W 72/0406 455/450 |
| 2016/0057797 | A1* | 2/2016 | Bangolae | H04W 52/0209 370/311 |
| 2016/0242110 | A1* | 8/2016 | Kant | H04W 48/18 |
| 2016/0345192 | A1* | 11/2016 | Garg | H04W 24/04 |
| 2017/0111929 | A1* | 4/2017 | Ronneke | H04W 74/002 |
| 2017/0201922 | A1* | 7/2017 | Akiyoshi | H04W 4/70 |

FOREIGN PATENT DOCUMENTS

| | | |
|---|---|---|
| KR | 101362384 B1 | 2/2014 |
| WO | WO 2013009346 A1 | 1/2013 |
| WO | WO 2013017839 A1 | 2/2013 |

OTHER PUBLICATIONS

Vojislav B. Misic, Jelena Misic, Dragan Nerandzic, Extending LTE to support machine-type communications, Jun. 10-15, 2012, IEEE International Conference on Communications (ICC), Ottawa, ON, Canada, pp. 1-5 (Year: 2012).*

Bontu Chandra S et al: "Wireless Wide-Area Networks for Internet of Things: An Air Interface Protcol for IoT and a Simultaneous Access Channel for Uplink IoT Communication", IEEE Vehicular Technology Magazine, IEEE, US, vol. 9, No. 1, Mar. 1, 2014 (Mar. 1, 2014), pp. 54-63, XP011541825.

"3$^{rd}$ Generation Partnership Project; Technical Specification Group GSM/EDGE Radio Access Network; Cellular System Support for Ultra Low Complexity and Low Throughput Internet of Things; (Release 13)", 3GPP Draft; TR 45 820 V121_CLEAN, 3$^{rd}$ Generation Partnership Project (3GPP), May 22, 2015 (May 22, 2015), XP050969606.

Wang Kun et al: "Energy-efficiency of LTE for small data machine-to-machine communications", 2013 IEEE International Conference on Communications (ICC), IEEE, Jun. 9, 2013 (Jun. 9, 2013), pp. 4120-4124, XP032522713.

Yu Liu et al: "Efficient Downlink Scheduling with Discontinuous Reception (DRX) Mechanism in LTE Network", 2015 International Conference on Computing, Networking and Communications, Wireless Networks Symposium, Feb. 16-19, 2015, pp. 1019-1023.

3GPP TS 36.414 V12.1.0 (Dec. 2014), 3$^{rd}$ Generation Partnership Project; Technical Specification Group Radio Access Network; Evolved Universal Terrestrial Radio Access Network (E-UTRAN); S1 data transport (Release 12), Dec. 2014, pp. 1-8.

* cited by examiner

US 10,887,821 B2

TRANSMITTING SMALL AND INFREQUENT COMMUNICATION DATA BETWEEN, ON THE ONE HAND, A PLURALITY OF INTERNET-OF-THINGS COMMUNICATION DEVICES, AND, ON THE OTHER HAND, A MOBILE COMMUNICATION NETWORK

CROSS-REFERENCE TO RELATED APPLICATIONS

This application is a U.S. National Phase application under 35 U.S.C. § 371 of International Application No. PCT/EP2016/062625, filed on Jun. 3, 2016, and claims benefit to European Patent Application No. EP 15170923.5, filed on Jun. 5, 2015. The International Application was published in English on Dec. 8, 2016 as WO 2016/193415 A1 under PCT Article 21(2).

FIELD

The present invention relates to a method for transmitting small and infrequent communication data between, on the one hand, a plurality of internet-of-things communication devices, and, on the other hand, a mobile communication network, the mobile communication network comprising an access network and a core network, wherein the access network comprises at least a radio cell and a base station entity associated with the radio cell, the base station entity comprising an antenna equipment, wherein the antenna equipment is used for receiving and/or transmitting the small and infrequent communication data, wherein the internet-of-things communication devices use radiofrequency electromagnetic signals, being received and/or transmitted by the antenna equipment of the base station entity, to transmit and/or receive the small and infrequent communication data at least in the direction from the internet-of-things communication devices towards the base station entity or in the direction from the base station entity towards the internet-of-things communication devices.

Furthermore, the present invention relates to a system and a mobile communication network for transmitting small and infrequent communication data between, on the one hand, a plurality of internet-of-things communication devices, and, on the other hand, a mobile communication network, wherein the system comprises a mobile communication network and the plurality of internet-of-things communication devices, wherein the mobile communication network comprises an access network and a core network, wherein the access network comprises at least a radio cell and a base station entity associated with the radio cell, the base station entity comprising an antenna equipment, wherein the antenna equipment is used for receiving and/or transmitting the small and infrequent communication data, wherein the internet-of-things communication devices use radiofrequency electromagnetic signals, being received and/or transmitted by the antenna equipment of the base station entity, to transmit and/or receive the small and infrequent communication data at least in the direction from the internet-of-things communication devices towards the base station entity or in the direction from the base station entity towards the internet-of-things communication devices.

Additionally, the present invention relates to an internet-of-things communication device suitable for transmitting and/or receiving small and infrequent communication data between, on the one hand, a plurality of internet-of-things communication devices, and, on the other hand, a mobile communication network.

Furthermore, the present invention relates to a program and to a computer program product for providing communication services to a plurality of user equipments of a telecommunications network according to exemplary embodiments of the inventive method, system and mobile communication network.

BACKGROUND

With the Internet of Things, all kinds of "things" (sensors, industrial systems, cars, meters, etc.) will be connected or will connect to the internet and will be able to communicate with each other or with an application server. It is predicted that by the early years of the next decade over 20 billion devices will be wirelessly connected in the Internet of Things (IoT), and some analysts even predict that the number of such connected devices (or radio devices or internet-of-things communication devices) will grow into the tens of billions until the end of this decade.

Many of the use cases of the Internet of Things imply a sporadic or nomadic connectivity behavior of the "thing", i.e. the internet-of-things communication device, i.e. resulting in a small and infrequent data required to be transmitted especially from the internet-of-things communication devices towards each other or towards an application server but, at least partly, also in the opposite direction. During these connections, only a very limited amount of user data is typically transferred. It is therefore a relevant question how these internet-of-things communication devices being "connected everywhere, anytime" can be achieved. As it cannot be assumed that wired connectivity can serve those use cases or is even available when and where the "things" (or internet-of-things communication devices) want to connect, it is expected that wireless systems will be used in the majority of cases.

Therefore, many of these internet-of-things communication devices will use wireless systems and would benefit from a mobile/wireless communication network allowing for low-cost/low-energy radio devices (or internet-of-things communication devices) that are able to operate for years on a small battery.

This is where the cellular variant of the Internet of Things comes into play there is already a virtually global wireless network available in the form of today's cellular mobile communication networks using different radio technologies. This fact has led to the notion of a cellular Internet of Things, or CIoT, as the most feasible solution to address the connectivity needs of the Internet of Things especially when it comes to wide area networks rather than local area networks.

However, today's cellular mobile communication networks are either focused on voice and messaging services (e.g. Global System for Mobile Communications (GSM)), or high speed broadband data services (e.g. Universal Mobile Telecommunications System/High-Speed Packet Access (UMTS/HSPA), Long-Term Evolution/Long-Term Evolution Advanced (LTE/LTE-A)). This particular design focus does not fit well with the expected requirement of internet-of-things communication devices for "infrequent small data transmissions". In addition, today's cellular mobile communication networks are not designed to handle a number of internet-of-things communication devices that may be as large as three orders of magnitude above the number of today's (smart-) phones. Further, those technologies are not highly optimized with regard to power consumption of the communication devices, whereas especially internet-of-things communication devices require an ultralow power consumption in order to run at least one year but preferably several years on small batteries.

A number of proposals have been discussed on how to enhance cellular networks in order to make them fit for the expected Cellular Internet of Things:

- optimized signaling: Typically, a number of signaling procedures implemented in cellular mobile communication networks and used by user equipments (such as smartphones) are either not needed or can be simplified in many CIoT use cases;
- data transmission via control plane: While (mobile communication network connected) devices apply the normal signaling of the cellular mobile communication network including the initial setup of user plane resources the (payload) data transmission (of the internet-of-things use case) actually takes place over the control plane of the mobile communication network, removing the need for any additional user plane resource management;
- control-plane only: In this variant, a CIoT device would not use any user plane resources at all; only a control channel is established and then used to transmit the small and infrequent communication data of the internet-of-things use case.
- clean-slate radio proposals: These solutions include the integration of an internet-of-things "lightweight" radio technology with the cellular mobile communication network according to at least one standardized kind of network access to the core network of the mobile communication network (i.e. GSM, UMTS/HSPA, or LTE/LTE-A).

However, none of the above proposed solutions results in an optimized CIoT network, given that all these approaches either

- only remove certain unnecessary functionality from the existing systems, or
- add some variant of 3GPP-like core network communication on top of a clean-slate radio technology in order to serve the CIoT use cases.

SUMMARY

In an exemplary embodiment, the present invention provides a method for transmitting small and infrequent communication data between, on the one hand, a plurality of internet-of-things communication devices, and, on the other hand, a mobile communication network. The mobile communication network comprises an access network and a core network. The access network comprises a radio cell and a base station entity associated with the radio cell. The base station entity comprises an antenna equipment. The antenna equipment is configured for receiving and/or transmitting the small and infrequent communication data. The plurality of internet-of-things communication devices are configured to transmit the small and infrequent communication data towards the base station entity and/or receive the small and infrequent communication data from the base station entity. A payload size of the small and infrequent communication data is lower than 10 kilobytes and/or the small and infrequent communication data have an average bitrate, per time interval of at least 60 minutes, of lower than 10 Bd (10 bits per second). The mobile communication network is configured to provide mobile communication services involving mobile communication data having bitrates of at least 9.6 kBd (9600 bits per second) and using the antenna equipment or a further antenna equipment of the base station entity to mobile subscribers of the mobile communication network.

An air interface between the base station entity and the mobile subscribers comprises a plurality of radio channels within at least one frequency band to provide the mobile communication services. The method comprises: transmitting, by the base station entity, the small and infrequent communication data, at least partly, as part of a payload portion of an IP packet towards a network node of the core network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
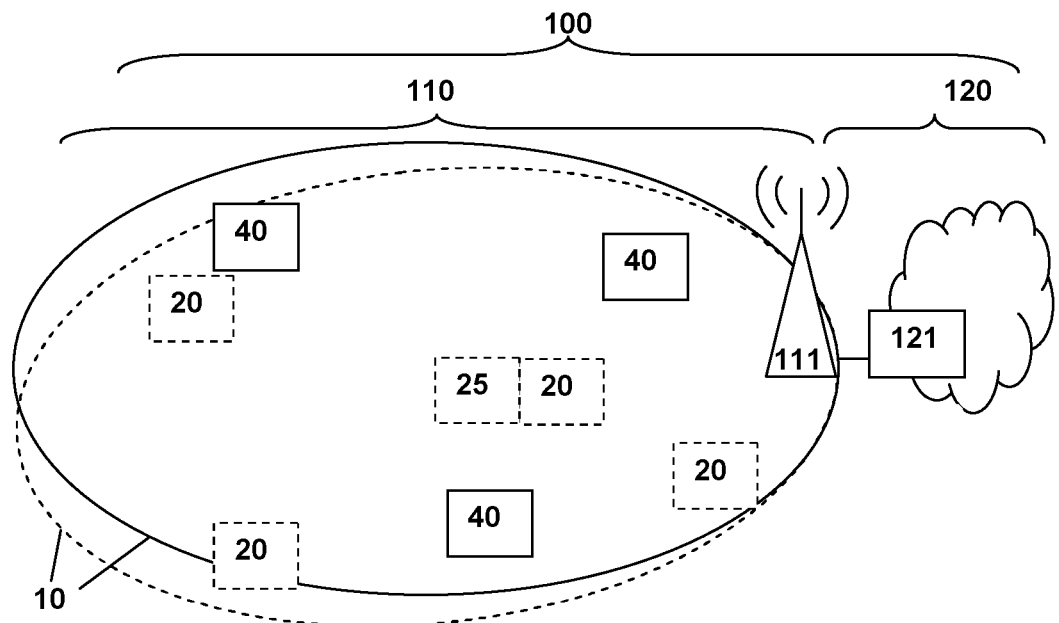
FIG. 1 schematically illustrates a mobile communication network comprising a radio cell being served by a base station entity, a plurality of mobile subscribers or user equipments being served by the mobile communication network, and a plurality of internet-of-things communication devices for transmitting small and infrequent communication data with the mobile communication network.

Exemplary embodiments of the present invention provide for transmission of small and infrequent communication data between a plurality of internet-of-things communication devices and a mobile communication network such that on the one hand existing infrastructure of the cellular mobile communication network is able to be used, and on the other hand the use cases of the Cellular Internet of Things as well as the internet-of-things communication devices are as much as possible freed from any burden (typically increasing power consumption) solely related with or caused by the use of the existing infrastructure of the cellular mobile communication network.

In an exemplary embodiment, the present invention provides a method for transmitting (or exchanging) small and infrequent communication data between, on the one hand, a plurality of internet-of-things communication devices, and, on the other hand, a mobile communication network, the mobile communication network comprising an access network and core network, wherein the access network comprises at least a radio cell and a base station entity associated with the radio cell, the base station entity comprising an antenna equipment, wherein the antenna equipment is used for receiving and/or transmitting the small and infrequent communication data, wherein the internet-of-things communication devices use radiofrequency electromagnetic signals, being received by the antenna equipment of the base station entity to transmit the small and infrequent communication data at least in the direction from the internet-of-things communication devices towards the base station entity and/or being transmitted by the antenna equipment of the base station entity to receive the small and infrequent communication data at least in the direction from the base station entity towards the internet-of-things communication devices, wherein the payload size of the small and infrequent communication data is lower than 10 kilobytes and/or the small and infrequent communication data have an average bitrate, per time interval of at least 60 minutes, of lower than 10 Bd (10 bits per second), wherein the mobile communication network provides mobile communication services involving mobile communication data having bitrates of at least 9.6 kBd (9600 bits per second), especially involving mobile communication data having comparably high bitrates of at least 9.6 kBd (9600 bits per second), and using the antenna equipment or a further antenna equipment of the base station entity to mobile subscribers of the mobile communication network, wherein the air interface between the base station entity and the mobile subscribers comprises a plurality of radio channels within at least one frequency band to provide the mobile communication services, wherein the method comprises the step of the base station entity transmitting and/or receiving the small and infrequent communication data, at least partly, as part of the payload portion of an Internet Protocol (IP) packet towards and/or from a network node of the core network.

It is thereby advantageously possible according to the present invention that a radically new approach is not only used with respect to the radio link between internet-of-things communication devices and the mobile network (clean slate radio approach with a new air interface, dedicated to be used in connection with internet-of-things applications) but also in relation to improvements in achieving internet-of-things related data transmission end to end.

Theoretically all clean-slate radio technologies can be adapted to a classical cellular core network of a mobile communication network (be it General Packet Radio Service (GPRS) core, UMTS core or the Evolved Packet Core (EPC) for LTE), but the protocols of those core network architectures do not match to the simplicity which is required for an ultra low-cost and efficient Cellular Internet of Things system.

According to the present invention, small and infrequent communication data are transmitted between at least one internet-of-things communication device (of a plurality of internet-of-things communication devices), and a mobile communication network. It is likewise possible and preferred according to the present invention that a plurality of internet-of-things communication devices communicate with each other, i.e. at least two of these internet-of-things communication devices transmit small and infrequent communication data at least in one direction (i.e. from one of the two internet-of-things communication devices to the other) but preferably also in the opposite direction.

According to the present invention, the mobile communication network comprises an access network and a core network. The access network comprises at least a radio cell and a base station entity associated with the radio cell, the base station entity comprising an antenna equipment. The antenna equipment is used for receiving and/or transmitting the small and infrequent communication data. The internet-of-things communication devices use radiofrequency electromagnetic signals, being transmitted and/or received by the antenna equipment of the base station entity.

The small and infrequent communication data are at least transmitted in the uplink direction, i.e. in the direction from the internet-of-things communication devices towards the base station entity. According to a preferred variant of the present invention, other data but also small and infrequent communication data might also be transmitted in opposite direction (i.e. in downlink direction), i.e. in the direction from the base station entity towards the internet-of-things communication device (or to a plurality of internet-of-things communication devices).

According to the present invention, small and infrequent communication data correspond to data to be transmitted such that the payload size of the small and infrequent communication data (related to a unitary data transmission, i.e. "once") is lower than 10 kilobytes and/or the small and infrequent communication data have an average bitrate, per time interval of at least 60 minutes, of lower than 10 Bd (10 bits per second).

Of course, during a longer time interval (such as a day or a week or a month or a year), involving a plurality of unitary data transmissions of small and infrequent communication data, a higher amount of payload data (compared to 10 kilobytes) might be transmitted.

Additionally to providing the internet-of-things functionality, the mobile communication network (and hence typically the base station entities) provides mobile communication services involving mobile communication data having bitrates of at least 9.6 kBd (9600 bits per second), especially involving mobile communication data having comparably high bitrates of at least 9.6 kBd (9600 bits per second), and using the antenna equipment or a further antenna equipment of the base station entity to ("normal") mobile subscribers of the mobile communication network, wherein the air interface between the base station entity and the mobile subscribers comprises a plurality of radio channels within at least one frequency band to provide the mobile communication services.

According to the present invention, the base station entity transmits and/or receives the small and infrequent communication data, at least partly, as part of the payload portion of an IP packet towards and/or from a network node of the core network. Thereby, a comparatively high flexibility is possible in integrating the internet-of-things functionality with the cellular mobile communication network.

According to the present invention it is preferred that the electromagnetic signals, transmitting the small and infrequent communication data, are transmitted using a frequency or a plurality of frequencies that is or are different from a frequency of the at least one radio channel of the at least one frequency band to provide the mobile communication services of the mobile communication network and/or overlapping at least partially with a frequency of at least one radio channel of the at least one frequency band to provide the mobile communication services of the mobile communication network, in an unlicensed portion of the electromagnetic spectrum or, in a licensed portion of the electromagnetic spectrum.

According to the present invention it is preferred that the electromagnetic signals, transmitting the small and infrequent communication data, are different e.g. the frequency domain or the time domain or the code domain from the at least one radio channel of the at least one frequency band to provide the mobile communication services of the mobile communication network and/or overlapping at least partially in e.g. the frequency domain or the time domain or the code domain with at least one radio channel of the at least one frequency band to provide the mobile communication services of the mobile communication network, in an unlicensed portion of the electromagnetic spectrum or, in a licensed portion of the electromagnetic spectrum.

Thereby, it is advantageously possible for the mobile communication network (or, within the radio cell served by the base station entity, for the base station entity) both to provide exchange of small and infrequent communication data with the internet-of-things communication devices, and to provide mobile communication services to the mobile subscribers or user equipments of the mobile communication network. The mobile communication services provided to the mobile subscribers or user equipments typically involve licensed radio spectrum. However, also unlicensed radio spectrum might be used for serving these mobile subscribers or user equipments, especially when using LTE or LTE advanced radio access technology. The radiofrequency electromagnetic signals used to exchange the small and infrequent communication data between, on the one hand, the internet-of-things communication devices, and, on the other hand, the mobile communication network often use unlicensed radio spectrum. However, also the use of licensed radio spectrum for transmitting and/or receiving these small and infrequent communication data is possible and preferred according to the present invention. It is even conceivable that unlicensed radio spectrum is used for exchanging small and infrequent communication data between a first group of internet-of-things communication devices and the mobile communication network, and that licensed radio spectrum is used for exchanging small and infrequent communication data between a second group of internet-of-things communication devices (perhaps within the same radio cell than the first group of internet-of-things communication devices) and the mobile communication network. It is clear that, in case that for a given mobile subscriber or user equipment a communication service involving licensed radio spectrum is used, and for a given internet-of-things communication device small and infrequent communication data are exchanged involving unlicensed radio spectrum, the electromagnetic signals, transmitting/receiving the small and infrequent communication data are different e.g. in the frequency domain or the time domain or the code domain from the radio channel used to provide the mobile communication services (of the mobile subscribers). However, it is conceivable even in the identical radio cell that, regarding at least another mobile subscriber or regarding at least another internet-of-things communication device, electromagnetic signals are used to transmit the small and infrequent communication data such that these electromagnetic signals are overlapping at least partially in e.g. the frequency domain or the time domain or the code domain with at least one radio channel used for providing the mobile communication services of the mobile communication network.

According to a further preferred embodiment of the present invention, each of the internet-of-things communication devices transmits a device identifier information, the device identifier information especially being unique for each of the internet-of-things communication devices.

Thereby, it is advantageously possible that the internet-of-things communication devices can be identified in an effective and straightforward manner. It is especially possible and preferred according to the present invention that the transmission of the device identifier information is protected, e.g. via encrypting the device identifier information. It is furthermore advantageously possible that this device identifier can be directly or indirectly used as a link-layer identifier on the radio link between the internet-of-things communication device and the radio cell of the mobile communication network.

According to a further embodiment of the present invention, it is also preferred that a destination address of IP packets sent from the base station entity towards the core network depends on pieces of device identifier information received from the internet-of-things communication devices, wherein the destination address especially corresponds to one out of the following:

a gateway or intermediate or service node or application server each being located either within the core network or outside of the core network but connected to the core network, another base station entity of the access network, an address of the base station entity itself, and wherein optionally in addition to the destination address, an address of a next-hop network node of the core network is defined, the next-hop network node corresponding to a next subsequent destination of the IP packet.

Thereby, it is advantageously possible for the base station entity to transmit the IP packet to the entity specified by the destination address while, optionally, in addition indicating a next-hop address of the next subsequent destination of the IP packet, preferably as a parameter contained in the IP packet payload or IP packet header.

According to the present invention it is furthermore preferred that the method comprises the step of assigning especially by the base station entity a proxy IP address to at least one of the internet-of-things communication devices, wherein in case of small and infrequent communication data being received, by the base station entity, from the at least one internet-of-things communication device the proxy IP address is used as source address of the IP packet corresponding to the small and infrequent communication data sent from the base station entity towards the core network, wherein especially the proxy IP address is used as destination address in case of small and infrequent communication data to be received by the at least one internet-of-things communication device.

Thereby, it is advantageously possible according to the present invention, that the base station entity maintains a lookup table or other database such that, for a specific devices identifier information of an internet-of-things communication device, a destination address and optionally a next-hop address and/or a proxy IP address is stored in the database or lookup table. Thereby, it is advantageously possible to provide the destination address and optionally next-hop address and/or the proxy IP address to the respective IP packet sent or received by the base station entity to/from the core network.

In another embodiment of the invention, it is advantageously possible that the base station entity retrieves the destination address and/or the next-hop address and/or the proxy IP address via a name resolution mechanism, using at least parts of the device identifier information provided by the internet-of-things communication device as input parameter into the name resolution mechanism.

Via assigning a proxy IP address, it is advantageously possible to assign a source address to the internet-of-things communication devices. Provided that the internet-of-things communication device remains localized within the same radio cell (or any mobility towards another base station entity is tracked and corresponding addressing is updated), it is even possible that the internet-of-things communication device receives data based on the proxy IP address. However, as the internet-of-things communication device does not have native IP connectivity, this depends on the base station entity providing an interworking functionality between the specific device identifier and/or link-layer identifier of the internet-of-things communication devices and IP connectivity.

According to the present invention it is furthermore preferred that the internet-of-things communication devices are configured to be operated in an active mode and/or in an idle mode and/or in a sleep mode, wherein time intervals of the internet-of-things communication devices being in active mode and/or idle mode and/or sleep mode are either communicated between the internet-of-things communication devices and the base station entity or between the internet-of-things communication devices and an associated application server entity, or are known to the base station entity, and wherein especially data are buffered in the base station entity in case of small and infrequent communication data to be transmitted to the internet-of-things communication devices.

It is thereby advantageously possible according to the present invention that the internet-of-things communication devices can be operated in a very low-energy consuming manner.

According to a further preferred embodiment of the present invention, an internet-of-things control device is connected to at least one of the internet-of-things communication devices, wherein the method comprises the step of the internet-of-things control device generating, at least partly, the IP packet that the base station entity transmits towards the core network comprising the small and infrequent communication data, wherein the internet-of-things control device especially defines the destination address of the IP packet that the base station entity is transmitting towards the network node and/or wherein the base station entity especially adds and/or complements the IP packet, especially the header portion and/or the source address of the IP packet.

Thereby, it is advantageously possible to use the internet-of-things communication devices to connect an internet-of-things control device that is able to generate an IP packet that is, e.g., transparently transmitted via the base station entity.

Furthermore, the present invention relates to a system for transmitting (or exchanging) small and infrequent communication data between, on the one hand, a plurality of internet-of-things communication devices, and, on the other hand, a mobile communication network, wherein the system comprises a mobile communication network and the plurality of internet-of-things communication devices, wherein the mobile communication network comprises an access network and a core network, wherein the access network comprises at least a radio cell and a base station entity associated with the radio cell, the base station entity comprising an antenna equipment, wherein the antenna equipment is used for receiving and/or transmitting the small and infrequent communication data, wherein the internet-of-things communication devices use radiofrequency electromagnetic signals, being received by the antenna equipment of the base station entity, to transmit the small and infrequent communication data at least in the direction from the internet-of-things communication devices towards the base station entity and/or being transmitted by the antenna equipment of the base station entity to receive the small and infrequent communication data at least in the direction from the base station entity towards the internet-of-things communication devices, wherein
the payload size of the small and infrequent communication data is lower than 10 kilobytes and/or
the small and infrequent communication data have an average bitrate, per time interval of at least 60 minutes, of lower than 10 Bd (10 bits per second),
wherein the mobile communication network provides mobile communication services involving mobile communication data having bitrates of at least 9.6 kBd (9600 bits per second), especially involving mobile communication data having comparably high bitrates of at least 9.6 kBd (9600 bits per second), and using the antenna equipment or a further antenna equipment of the base station entity to mobile subscribers of the mobile communication network, wherein the air interface between the base station entity and the mobile subscribers comprises a plurality of radio channels within at least one frequency band to provide the mobile communication services,
wherein the system is configured such that the base station entity transmits the small and infrequent communication data, at least partly, as part of the payload portion of an IP packet towards a network node of the core network.

Thereby, it is advantageously possible to provide a system that provides the advantages of exemplary embodiments of the inventive method.

Furthermore, the present invention relates to an internet-of-things communication device suitable for exchanging small and infrequent communication data between, on the one hand, a plurality of internet-of-things communication devices, and, on the other hand, a mobile communication network in exemplary embodiments of an inventive system, wherein the internet-of-things communication device especially comprises an internet-of-things control device.

Furthermore, the present invention relates to an internet-of-things communication device suitable for transmitting small and infrequent communication data between, on the one hand, a plurality of internet-of-things communication devices, and, on the other hand, a mobile communication network in exemplary embodiments of an inventive system, wherein the internet-of-things communication device especially comprises an internet-of-things control device. Preferably, the internet-of-things control device is configured to control the plurality of internet-of-things communication devices and/or arbitrary entities, especially household appliances.

Furthermore, the present invention relates to a mobile communication network for transmitting (or exchanging) small and infrequent communication data between, on the one hand, a plurality of internet-of-things communication devices, and, on the other hand, the mobile communication network, the mobile communication network comprising an access network and a core network, wherein the access network comprises at least a radio cell and a base station entity associated with the radio cell, the base station entity comprising an antenna equipment, wherein the antenna equipment is used for receiving and/or transmitting the small and infrequent communication data,
wherein the internet-of-things communication devices are configured to use radiofrequency electromagnetic signals, being received by the antenna equipment of the base station entity to transmit the small and infrequent communication data at least in the direction from the internet-of-things communication devices towards the base station entity and/or being transmitted by the antenna equipment of the base station entity to receive the small and infrequent communication data at least in the direction from the base station entity towards the internet-of-things communication devices, wherein the payload size of the small and infrequent communication data is lower than 10 kilobytes and/or the small and infrequent communication data have an average bitrate, per time interval of at least 60 minutes, of lower than 10 Bd (10 bits per second), wherein the mobile communication network is configured to provide mobile communication services involving mobile communication data having bitrates of at least 9.6 kBd (9600 bits per second), especially involving mobile communication data having comparably high bitrates of at least 9.6 kBd (9600 bits per second), and using the antenna equipment or a further antenna equipment of the base station entity to mobile subscribers of the mobile communication network, wherein the air interface between the base station entity and the mobile subscribers comprises a plurality of radio channels within at least one frequency band to provide the mobile communication services, wherein the mobile communication network is configured such that the base station entity transmits the small and infrequent communication data, at least partly, as part of the payload portion of an IP packet towards a network node of the core network.

Thereby, it is advantageously possible to provide a mobile communication network that provides the advantages of exemplary embodiments of the inventive method and the inventive system.

Additionally, the present invention relates to a program comprising a computer readable program code which, when executed on a computer or on an internet-of-things communication device or on a network component of a mobile communication network or in part on an internet-of-things communication device and in part on a network component of a mobile communication network, causes the computer or the internet-of-things communication device and/or the network component of the mobile communication network to perform exemplary embodiments of the inventive method.

Still additionally, the present invention relates to a computer program product for transmitting (or exchanging) small and infrequent communication data between, on the one hand, a plurality of internet-of-things communication devices, and, on the other hand, a mobile communication network, the computer program product comprising a computer program stored on a storage medium, the computer program comprising program code which, when executed on a computer or on an internet-of-things communication device or on a network component of a mobile communication network or in part on an internet-of-things communication device and in part on a network component of a mobile communication network, causes the computer or the internet-of-things communication device and/or the network component of the mobile communication network to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 a mobile communication network 100 comprising a radio cell 10 being served by a base station entity 111 is schematically shown. In the example, the mobile communication network 100 comprises an access network 110 and a core network 120. The mobile communication network 100 is preferably a cellular telecommunications network comprising typically a plurality of network radio cells, one of which is represented in FIG. 1 via a solid line and reference sign 10. In the mobile communication network 100, typically a plurality of mobile subscribers 40 (or user equipments) are camping on the telecommunications network 100 within the network radio cell 10, i.e. the mobile subscribers 40 are connected or are camping on a base station entity 111 serving the radio cell 10. The base station entity 111 is typically a base station, e.g. a NodeB or an eNodeB base transceiver station. The mobile communication network 100 is configured to provide mobile communication services to the mobile subscribers 40 within the radio cell 10 of the mobile communication network 100. Preferably, mobile communication data (related to the mobile communication services) are transmitted between the mobile subscribers 40 and the mobile communication network via the base station entity 111, wherein the mobile communication data are transmitted with bitrates of at least 9.6 kBd (9600 bits per second), especially the mobile communication data are transmitted with comparably high bitrates of at least 9.6 kBd (9600 bits per second). The air interface between the base station entity 111 and the mobile subscribers 40 comprises a plurality of frequency channels within at least one frequency band to provide the mobile communication services.

The core network 120 is only schematically shown via a cloud representation and via one network node 121 of the core network 120. The public land mobile network (especially the core network 120) comprises typically various network elements such as an MSC (Mobile Switching Center), a SGSN (Serving GPRS Support Node), a MME (Mobility Management Entity), preferably a plurality of network elements thereof.

According to the present invention, a plurality of internet-of-things communication devices 20 are located within the network radio cell 10, i.e. the internet-of-things communication devices 20 are at least able to be connected to the base station entity 111 or at least a component thereof. One of the internet-of-things communication devices 20 is schematically shown with an internet-of-things control device 25. The internet-of-things control device 25 is typically integrated with the respective internet-of-things communication device 20.

The internet-of-things communication devices 20 are configured to exchange radiofrequency electromagnetic signals which are received and/or transmitted by the base station entity 111, transmitting/receiving small and infrequent communication data. The small and infrequent communication data are exchanged at a comparably low bitrate, in average per a time interval of at least 60 minutes, of at most 10 Bd (10 bits per second). Furthermore, the payload size of the small and infrequent communication data is typically lower than 10 kilobytes per unitary data transmission (i.e. per data transmission event, e.g. transmitting a meter reading).

Figure 2:
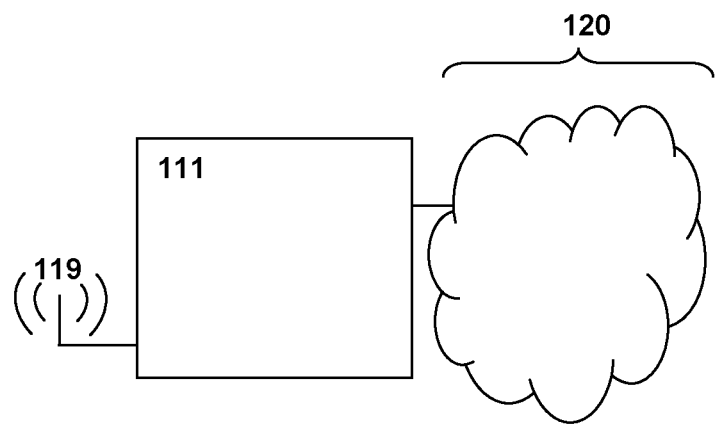
FIG. 2 schematically illustrates a base station entity being connected with the core network of the mobile communication network the base station entity comprising an antenna equipment.

In FIG. 2 a base station entity 111 being connected with the core network 120 of the mobile communication network 100 is schematically represented, the base station entity 111 comprising an antenna equipment 119.

According to the present invention an existing lightweight radio (such as Semtech, Sigfox or Neul) may be used without any changes to radio technologies (i.e. the air interface according to these technologies), and do all the interworking and adaptation in the core network, rather than having a tight integration of the upper layer of the different architectures as part of the device protocol stack of the internet-of-things communication devices 20.

Alternatively to using an existing lightweight radio (such as Semtech, Sigfox or Neul), a new "clean-slate" radio technology may be employed in the invention in the same way.

The internet-of-things communication devices 20 (CIoT radio devices) correspond to a very simple, battery-optimized radio modem that can only connect with a cellular base station (or base station entity 111) and send and receive data across that radio link (or air interface).

According to the present invention, no device related resource/QoS (quality of service) management is needed for the cellular Internet of Things use cases. The internet-of-things communication devices 20 also do not need a subscriber identification module (SIM) card, but could be optionally provided with one.

The internet-of-things communication devices 20 do not support any of the higher-layer communication protocols (above layer 2 Non Access Stratum in 3GPP nomenclature), and no communication with the core network 120 of the mobile communication network 100. Consequently, the internet-of-things communication devices 20 have no notion of an APN (Access Point Name), an application (server), or even Internet Protocol. All interworking towards the core network 120 will be performed in the radio access of the cellular mobile communication network 100.

When the internet-of-things communication device 20 wants to transmit data (i.e. small and infrequent communication data), it simply sends the data across the radio link towards the base station entity 111 (or even multiple cells or multiple base station entities). The system design should typically be such that a single frame (of small and infrequent communication data) is sufficient for most "small data" applications. If more data need to be transported than radio level segmentation and reassembly is applied in the media access control (MAC) or radio link control (RLC) radio layer. The same applies in principle to the case where a base station entity wants to transmit data to the internet-of-things communication device 20.

The base station entity 111 may use the device identity of the internet-of-things communication device 20 to obtain a "subscription record" that contains information on the application or core network addresses that apply for this internet-of-things communication device 20; in the simplest form, this device identity can a (comparatively "long") unique device identifier. This device identity also can be directly or indirectly used as a link-layer identifier on the radio link between the internet-of-things communication device 20 and the base station entity 111. The base station entity 111 then (i.e. after having received the small and infrequent communication data) encapsulates the received frame(s) into one IP packet or a plurality of IP packets (typically a single IP packet should be enough) and sends those to the destination indicated in the subscription record. Possible destinations may be:

- A gateway/service node within the operator domain (of the operator the mobile communication network 100), which provides the internet-of-things service itself or interfaces with a third-party application server this is transparent to the radio access network (RAN) and the internet-of-things communication device 20;
- A third-party gateway/application server, outside of the operator's core network (CN);
- A different RAN cell (i.e. a different base station entity, typically serving another radio cell (not depicted in FIG. 1)) for further processing, or
- The RAN cell (i.e. the base station entity 111) itself for local processing of the small and infrequent communication data.

Optionally, in addition to the destination address, an address of a next-hop network node may be defined in the subscription record, the next-hop network node corresponding to the next subsequent destination of the IP packet. Thereby, it is possible for the base station entity 111 to transmit the IP packet to the entity specified by the destination address while, optionally, in addition indicating a next-hop address of the next subsequent destination of the IP packet, preferably as a parameter contained in the IP packet payload or IP packet header.

Since the internet-of-things communication device 20 does not "speak" IP, the radio cell (i.e. the base station entity 111) preferably assigns a proxy IP address and maintains the mapping between that proxy IP address and the device identity and/or the link layer identifier of the internet-of-things communication device 20.

Depending on the content of the subscription record, the radio cell (i.e. the base station entity 111) may indicate a "next-hop" destination for the small and infrequent communication data in the IP packet that it sends to the destination address. The base station entity 111 only needs to provide the IP addresses accordingly (e.g. by applying tunneling or other IP encapsulation) it does not "see" any relation between the "next-hop" node and the destination node. In fact, even when the base station entity 111 only finds a "destination address" in the subscription record (and thus does not apply IP encapsulation or tunneling), that destination may actually be an intermediate node and not the final addressee of the small and infrequent communication data. In this case, the intermediate node itself needs a similar function as described for the base station entity 111 above in order to find the correct next network node to send that data to.

Mobility management of the internet-of-things communication devices 20 is typically limited to cell reselection by the internet-of-things communication devices 20. This assures that the internet-of-things communication device 20 is reachable via its most recent selected base station entity 111. This solution implies single-cell reachability area and no multi-cell area concept and paging as known in the context of conventional radio access technologies according to the 3GPP standardization; this can be done since the mobility requirements of a the internet-of-things communication devices 20 are much more reduced compared to those of a typical mobile subscriber of user equipment 40 of the mobile communication network 100, or even non-existent. Further hierarchy levels of reachability can be applied by using multiple radio cells (i.e. a plurality of base station entities) to address a internet-of-things communication device 20 in a particular area.

In the downlink direction, IP packets are sent towards the device either by using the proxy IP address assigned by the base station entity 111 (if that address has been provided to the sender), or towards the above destination and/or next hop node if the radio address has been hidden e.g. via tunneling or other IP encapsulation. In the former case, normal IP routing applies towards the cell. In the latter case, the destination and/or next-hop nodes need to maintain the tunneling parameters in order to apply the described tunneling in reverse fashion.

Finally, the base station entity 111 applies the IP-to-link mapping and forwards the data to the internet-of-things communication device 20.

Any variant of active/idle/sleep mode, and paging if required, are handled by the radio cell, i.e. the base station entity 111. If the internet-of-things communication devices 20 is "offline" when downlink data arrives, the base station entity 111 may buffer the data until the internet-of-things communication device 20 wakes up next time. Information on reachability times may be provided by the base station entity 111 to the core network entities (e.g., a similar function as described in 3GPP MTC (machine-type communication) power save mode/eDRX (extended discontinuous reception)). Alternatively the internet-of-things communication device 20 can be preconfigured by the corresponding radio cell (or base station entity 111) or an associated application server entity with a defined "reachability time". It is also possible that a certain time after a periodic keep alive signaling originating from the device.

According to the present invention, it is possible and preferred that on top of the internet-of-things communication device 20, an internet-of-things control device 25 is provided. The internet-of-things control device 25 provides higher-layer functions if and as required by a particular use case, e.g. access authorization and authentication, encryption, application management functions. The internet-of-things control device 25 "speaks IP" (i.e. it is able to generate IP packets) and may control and provide its functionality to one or many CIoT radio devices. All interworking is still done in the RAN (radio access network) as described above, the only difference being that the RAN cell already receives an IP packet.

Such IP packets may contain a valid destination address, in which case the base station entity 111 simply forwards the IP packet accordingly. The base station entity 111 may also apply another destination address if the received address is not valid, or depending on the content of the subscription record. Both tunneling and non-tunneling variants as described above are possible in either case.

A modular approach for the internet-of-things control device 25 is also possible so that the interworking with a particular core network type or architecture is independent of the radio interface allowing to connect to a range of core network architectures if needed.

According to the present invention, a high degree of independency between the radio functions, the "radio convergence layer/function" and the destination nodes is provided in order to enhance flexibility and simplicity of the radio function of the internet-of-things communication device 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for interworking between, on the one hand, a plurality of internet-of-things communication devices, and, on the other hand, a mobile communication network, comprising:

providing, by a base station entity associated with a radio cell of an access network of the mobile communication network, interworking functionality towards a core network of the mobile communication network for the plurality of internet-of-things communication devices, wherein the plurality of internet-of-things communication devices do not support any higher-layer communication protocol above layer 2 or Non-Access Stratum in 3GPP nomenclature such that the plurality of internet-of-things communication devices have no notion of Internet Protocol (IP), wherein device-related quality-of-service (QoS) management is not implemented for the plurality of internet-of-things communication devices, and wherein the base station entity providing the interworking functionality includes:

receiving, by the base station entity, one or more frames comprising communication data from a respective internet-of-things communication device of the plurality of internet-of-things communication devices via a radio link;

encapsulating, by the base station entity, the one or more received frames into one or more IP packets; and transmitting, by the base station entity, the communication data, at least partly, as part of a payload portion of the one or more IP packets towards a network node of the core network specified by a destination address of the one or more IP packets, wherein the destination address of the one or more IP packets transmitted by the base station entity is based on device identifier information of the respective internet-of-things communication device received by the base station entity from the respective internet-of-things communication device, wherein transmission of the device identifier information is protected via encrypting the device identifier information, wherein the device identifier information uniquely corresponds to the respective internet-of-things device, wherein the base station entity is configured to maintain a lookup table or other database such that, for the device identifier information of the respective internet-of-things communication device, the destination address is stored in the lookup table or other database, and wherein the destination address corresponds to an application server located either within the core network or outside of the core network but connected to the core network;

wherein the mobile communication network is configured to provide mobile communication services—involving mobile communication data having bitrates of at least 9.6 kilobits per second and using antenna equipment of the base station entity—to mobile subscribers of the mobile communication network, wherein an air interface between the base station entity and the mobile subscribers comprises a plurality of radio channels within at least one frequency band to provide the mobile communication services.

2. The method according to claim 1, wherein the communication data is transmitted using a frequency or a plurality of frequencies that is or are:

different from a frequency of the at least one radio channel of the at least one frequency band to provide the mobile communication services of the mobile communication network; and/or overlapping—at least partially with a frequency of at least one radio channel of the at least one frequency band to provide the mobile communication services of the mobile communication network.

3. The method according to claim 1, wherein each of the plurality of internet-of-things communication devices transmits respective device identifier information, the respective device identifier information being unique for each of the internet-of-things communication devices, wherein the respective device identifier information is directly or indirectly used as a link-layer identifier on the radio link between the plurality of internet-of-things communication devices and the base station entity of the mobile communication network.

4. The method according to claim 1, wherein the method further comprises:

assigning, by the base station entity, a proxy IP address to at least one of the plurality of internet-of-things communication devices, wherein—in case of communication data being received, by the base station entity, from the at least one internet-of-things communication device—the proxy IP address is used as source address of the one or more IP packets corresponding to the communication data sent from the base station entity towards the core network, wherein the proxy IP address is used as the destination address in case of communication data to be received by the at least one internet-of-things communication device.

5. The method according to claim 1, wherein the plurality of internet-of-things communication devices are configured to be operated in an active mode and/or in an idle mode and/or in a sleep mode, wherein time intervals of the internet-of-things communication devices being in the active mode and/or idle mode and/or sleep mode are either communicated between the plurality of internet-of-things communication devices and the base station entity or between the plurality of internet-of-things communication devices and an associated application server entity, or are known to the base station entity.

6. The method according to claim 1, wherein the communication data is transmitted using a frequency or a plurality of frequencies that is or are:

in an unlicensed portion of the electromagnetic spectrum; or in a licensed portion of the electromagnetic spectrum.

7. The method according to claim 1, wherein in addition to the destination address, an address of a next-hop network node of the core network is defined, the next-hop network node corresponding to a next subsequent destination of the one or more IP packets.

8. The method according to claim 1, wherein for the identifier information of the respective internet-of-things communication device, a next-hop address and/or a proxy IP address is stored in the lookup table or other database.

9. The method according to claim 8, wherein the base station entity retrieves the destination address and/or the next-hop address and/or the proxy IP address via a name resolution mechanism, using at least parts of the device identifier information provided by the respective internet-of-things communication device as an input parameter into the name resolution mechanism.

10. The method according to claim 1, wherein the communication data is small and infrequent communication data having a payload size lower than 10 kilobytes and/or an average bitrate, per time interval of at least 60 minutes, of lower than 10 bits per second (Bd).

11. The method according to claim 1, wherein small and infrequent communication data to be transmitted to the internet-of-things devices is buffered at the base station entity.

12. The method according to claim 11, wherein the small and infrequent communication data to be transmitted to the internet-of-things devices has a payload size lower than 10 kilobytes and/or an average bitrate, per time interval of at least 60 minutes, of lower than 10 bits per second (Bd).

13. The method according to claim 1, wherein small and infrequent communication data to be transmitted to a respective internet-of-things device is buffered at the base station entity based on the respective internet-of-things device being offline; and wherein the small and infrequent communication data to be transmitted to the respective internet-of-things device is buffered at the base station entity until the respective internet-of-things device wakes up.

14. The method according to claim 13, wherein the small and infrequent communication data to be transmitted to the respective internet-of-things device has a payload size lower than 10 kilobytes and/or an average bitrate, per time interval of at least 60 minutes, of lower than 10 bits per second (Bd).

15. A system for interworking between, on the one hand, a plurality of internet-of-things communication devices, and, on the other hand, a mobile communication network, wherein the system comprises:

the mobile communication network; and the plurality of internet-of-things communication devices, wherein the plurality of internet-of-things communication devices do not support any higher-layer communication protocol above layer 2 or Non-Access Stratum in 3GPP nomenclature such that the plurality of internet-of-things communication devices have no notion of Internet Protocol (IP), and wherein device-related quality-of-service (QoS) management is not implemented for the plurality of internet-of-things communication devices;

wherein the mobile communication network comprises an access network and a core network, wherein the access network comprises a radio cell and a base station entity associated with the radio cell;

wherein the mobile communication network is configured to provide mobile communication services—involving mobile communication data having bitrates of at least 9.6 kilobits per second and using antenna equipment of the base station entity—to mobile subscribers of the mobile communication network, wherein an air interface between the base station entity and the mobile subscribers comprises a plurality of radio channels within at least one frequency band to provide the mobile communication services;

wherein the base station entity is configured to provide interworking functionality towards the core network for the plurality of internet-of-things communication devices, wherein providing the interworking functionality includes:

receiving one or more frames comprising communication data from a respective internet-of-things communication device of the plurality of internet-of-things communication devices via a radio link;

encapsulating the one or more received frames into one or more IP packets; and transmitting the communication data, at least partly, as part of a payload portion of the one or more IP packets towards a network node of the core network specified by a destination address of the one or more IP packets, wherein the destination address of the one or more IP packets transmitted by the base station entity is based on device identifier information of the respective internet-of-things communication device received by the base station entity from the respective internet-of-things communication device, wherein transmission of the device identifier information is protected via encrypting the device identifier information, wherein the device identifier information uniquely corresponds to the respective internet-of-things device, wherein the base station entity is configured to maintain a lookup table or other database such that, for the device identifier information of the respective internet-of-things communication device, the destination address is stored in the lookup table or other database, and wherein the destination address corresponds to an application server located either within the core network or outside of the core network but connected to the core network.

16. A non-transitory computer-readable medium having processor-executable instructions stored thereon for interworking between, on the one hand, a plurality of internet-of-things communication devices, and, on the other hand, a mobile communication network, wherein the processor-executable instructions, when executed by a processor, facilitate performance of the following:

providing, by a base station entity associated with a radio cell of an access network of the mobile communication network, interworking functionality towards a core network of the mobile communication network for the plurality of internet-of-things communication devices, wherein the plurality of internet-of-things communication devices do not support any higher-layer communication protocol above layer 2 or Non-Access Stratum in 3GPP nomenclature such that the plurality of internet-of-things communication devices have no notion of Internet Protocol (IP), wherein device-related quality-of-service (QoS) management is not implemented for the plurality of internet-of-things communication devices, and wherein the base station entity providing the interworking functionality includes:

receiving, by the base station entity, one or more frames comprising communication data from a respective internet-of-things communication device of the plurality of internet-of-things communication devices via a radio link;

encapsulating, by the base station entity, the one or more received frames into one or more IP packets; and transmitting, by the base station entity, the communication data, at least partly, as part of a payload portion of the one or more IP packets towards a network node of the core network specified by a destination address of the one or more IP packets, wherein the destination address of the one or more IP packets transmitted by the base station entity is based on device identifier information of the respective internet-of-things communication device received by the base station entity from the respective internet-of-things communication device, wherein transmission of the device identifier information is protected via encrypting the device identifier information, wherein the device identifier information uniquely corresponds to the respective internet-of-things device, wherein the base station entity is configured to maintain a lookup table or other database such that, for the device identifier information of the respective internet-of-things communication device, the destination address is stored in the lookup table or other database, and wherein the destination address corresponds to an application server located either within the core network or outside of the core network but connected to the core network;

wherein the mobile communication network is configured to provide mobile communication services—involving mobile communication data having bitrates of at least 9.6 kilobits per second and using antenna equipment of the base station entity—to mobile subscribers of the mobile communication network, wherein an air interface between the base station entity and the mobile subscribers comprises a plurality of radio channels within at least one frequency band to provide the mobile communication services.

17. A method for interworking between, on the one hand, a plurality of internet-of-things communication devices, and, on the other hand, a mobile communication network, comprising:

providing, by a base station entity associated with a radio cell of an access network of the mobile communication network, interworking functionality towards a core network of the mobile communication network for the plurality of internet-of-things communication devices, wherein the plurality of internet-of-things communication devices do not support any higher-layer communication protocol above layer 2 or Non-Access Stratum in 3GPP nomenclature such that the plurality of internet-of-things communication devices have no notion of Internet Protocol (IP), wherein mobility management for the plurality of internet-of-things communication devices is limited to cell reselection by the plurality of internet-of-things communication devices, and wherein the base station entity providing the interworking functionality includes:

receiving, by the base station entity, one or more frames comprising communication data from a respective internet-of-things communication device of the plurality of internet-of-things communication devices via a radio link;

encapsulating, by the base station entity, the one or more received frames into one or more IP packets; and transmitting, by the base station entity, the communication data, at least partly, as part of a payload portion of the one or more IP packets towards a network node of the core network specified by a destination address of the one or more IP packets, wherein the destination address of the one or more IP packets transmitted by the base station entity is based on device identifier information of the respective internet-of-things communication device received by the base station entity from the respective internet-of-things communication device, wherein transmission of the device identifier information is protected via encrypting the device identifier information, wherein the device identifier information uniquely corresponds to the respective internet-of-things device, wherein the base station entity is configured to maintain a lookup table or other database such that, for the device identifier information of the respective internet-of-things communication device, the destination address is stored in the lookup table or other database, and wherein the destination address corresponds to an application server located either within the core network or outside of the core network but connected to the core network;

wherein the mobile communication network is configured to provide mobile communication services—involving mobile communication data having bitrates of at least 9.6 kilobits per second and using antenna equipment of the base station entity—to mobile subscribers of the mobile communication network, wherein an air interface between the base station entity and the mobile subscribers comprises a plurality of radio channels within at least one frequency band to provide the mobile communication services.

* * * * *